United States Patent Office 3,288,864
Patented Nov. 29, 1966

3,288,864
REACTION PRODUCTS OF ISOPROPENYL PHENOLS AND OF LINEAR DIMERS THEREOF
Alford G. Farnham, Mendham, N.J., assignor to Union Carbide Corporation, a corporation of New York
No Drawing. Filed May 11, 1962, Ser. No. 194,186
16 Claims. (Cl. 260—619)

This invention relates to reaction products of isopropenyl phenols, to reaction products of linear dimers of isopropenyl phenols and to processes for the production of such reaction products.

Isopropenyl phenols from which reaction products of this invention are formed have the formula:

(Formula I)

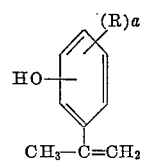

wherein each R, which can be the same or different, are halogen atoms, such as chlorine, bromine, iodine or fluorine; or alkyl, and when alkyl generally containing 1 to 4 carbon atoms inclusive, as illustrated by methyl, ethyl, n-propyl, isopropyl, n-butyl and the like, each $a$ is an integer having a value of 0 to 4 inclusive and with the further limitation that each OH group is in a position other than meta with respect to the alkenyl group.

Linear dimers, from which reaction products of this invention are formed, have the formula:

(Formula II)

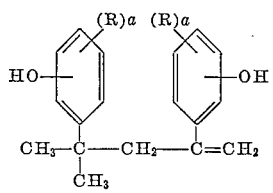

wherein each R, which on the same nucleus, can be the same or different, but are the same with respect to corresponding R's on the other nucleus, are as previously defined, $a$ is as previously defined and the position of each OH group is other than meta with respect to the group linking the aromatic nuclei.

Compounds falling within the scope of Formula I can be conveniently prepared according to the procedures set forth by B. B. Corson et al. in J. Organic Chemistry, 23, page 544 (1958).

Linear dimers falling within the scope of Formula II can be conveniently prepared by dimerizing compounds of Formula I according to the procedure set forth in Example 2 of this application.

In one aspect of the present invention, the isopropenyl compounds falling within the scope of Formula I are self-condensed in the presence of a Friedel-Crafts catalyst to form cyclic dimers. This reaction can be illustrated by the following equation:

EQUATION 1

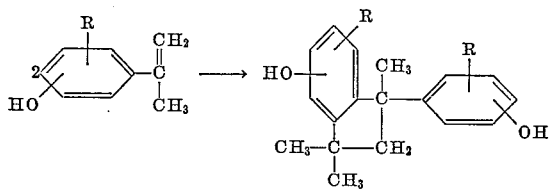

wherein R and the position of OH are as previously defined.

The self-condensation of isopropenyl phenols to produce cyclic compounds, as stated, is conducted in a reaction medium containing a Friedel-Crafts catalyst. Friedel-Crafts catalysts are compounds which accept electrons, according to the electronic theory of acids and bases.

Exemplary of such compounds are the metal halides, such as boron trifluoride, aluminum chloride, ferric chloride, zinc chloride and stannic chloride. The various metal halides can also be employed in the form of ether or amine complexes. Typical of such complexes are piperidine-boron trifluoride complex, ethyl amine-boron fluoride complex, diethyl ether-boron trifluoride complex and the like. For a further discussion of electron acceptor compounds, reference is made to the article of G. N. Lewis, "Valence and Structures of Atoms and Molecules," Chemical Catalogue Co., 1923, which is incorporated herein by reference.

Friedel-Crafts catalysts are employed in catalytic amounts, that is, in amounts sufficient to catalyze the condensation reaction. As a rule, amounts used actually range from about 0.05 to about 5 percent by weight, and preferably from about 0.1 to about 2 percent by weight, based on the weight of the isopropenyl phenol. More than about 5 percent by weight can be used, but this is economically undesirable.

The temperature at which the condensation reaction of an isopropenyl phenol to the corresponding cyclic dimer is conducted is generally in the range of about 50° C. to about 150° C. and preferably in the range of about 70° C. to about 110° C.

The pressure at which the condensation reaction is carried out can be atmospheric, subatmospheric or superatmospheric. It is preferred to conduct this reaction under atmospheric pressure.

It is also preferred to conduct this reaction in an organic diluent which is non-reactive with respect to the starting materials and to the final product and in which the final product is insoluble. Using such an organic diluent, the product is simply removed from the reaction mixture by a filtration operation. Among suitable organic diluents can be noted toluene, benzene, xylene, chlorobenzene and the like.

The actual length of time that the isopropenyl phenols are maintained at the temperatures noted during the production of the corresponding cyclic dimers therefrom will, of course, vary and depend upon the isopropenyl phenol being condensed and the exact temperatures being employed.

In still another aspect of the present invention, an isopropenyl phenol falling within the scope of Formula I or a linear dimer falling within the scope of Formula II is reacted with a phenol having the formula:

(Formula III)

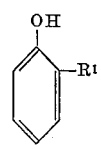

wherein $R^1$ is hydrogen or an alkyl as defined for R, to produce a dihydric polynuclear phenol.

The reaction between an isopropenyl phenol falling within the scope of Formula I and a phenol falling within the scope of Formula III proceeds as follows:

EQUATION 2

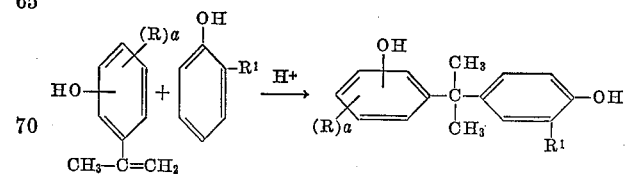

wherein R, $a$ and the position of OH are as previously defined.

The reaction between a linear dimer falling within the scope of Formula II and a phenol falling within the scope of Formula III proceeds as follows:

EQUATION 3

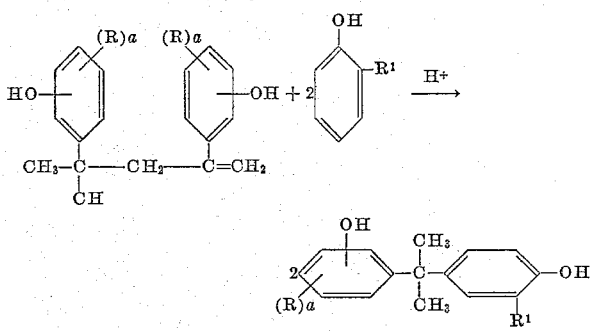

The reactions set forth in Equations 2 and 3 are conducted in a medium which has a pH of less than about 2, and preferably less than about 1.5. Any acid or mixture thereof which will effect a pH of less than about 2 in the reaction mixture can be admixed with the reactants. Particularly preferred for this purpose are the mineral acids, such as hydrochloric acid, phosphoric acid, sulfuric acid and the like. Other suitable acids include hydrobromic acid, p-toluene sulfonic acid and the like.

On conducting this reaction, various amounts of reactants can be used. Generally, the phenol, falling within the scope of Formula III, is used in an excess. In those instances wherein an isopropenyl phenol is one of the reactants, the phenol is used in an amount of at least about 1 mole and preferably about 5 moles per mole of the isopropenyl phenol. More than about 5 moles of the phenol per mole of the isopropenyl phenol can be used, but this is undesirable from an economic standpoint. As a practical matter, about 2 moles to about 5 moles of phenol per mole of isopropenyl phenol can be utilized with good results.

In those instances wherein one of the reactants is a linear dimer falling within the scope of Formula II, the phenol is used in an amount of at least about 2 moles and preferably about 4 moles to about 10 moles per mole of the linear dimer. More than about 10 moles of the phenol can be used, but this is economically undesirable. Again, as a practical matter, about 4 moles to about 10 moles of phenol, per mole of linear dimer, can be utilized with good results.

The temperature at which this reaction is conducted is usually on the order of about 25° C. to about 75° C. and preferably about 40° C. to about 60° C.

At the completion of the reaction, any unreacted phenol is removed from the product by distillation.

In still another aspect of the present invention, an isopropenyl phenol falling within the scope of Formula I; or a linear dimer falling within the scope of Formula II is self-condensed to form a linear trimer by allowing the isopropenyl phenol or the linear dimer thereof to stand at a temperature of about 20° C. to about 40° C. and preferably at a temperature of about 25° C. to about 30° C. in a reaction medium having a pH of less than about 2 and preferably less than about 1.5. Suitable acids for effecting the desired pH have been previously defined in the specification. These condensation reactions proceed as follows:

EQUATION 4

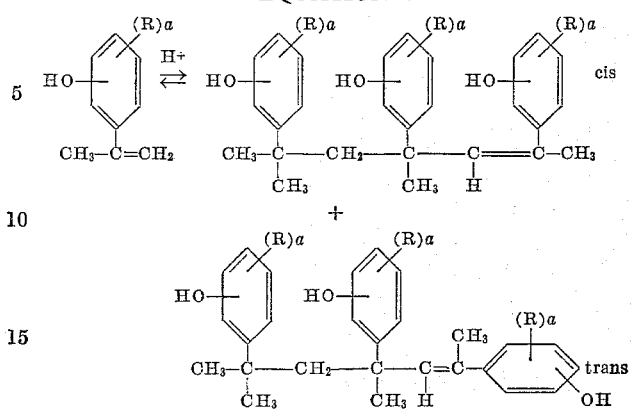

wherein R, $a$ and the position of HO have been previously defined.

When a linear dimer is used as one of the reactants, the dimer forms an ion which self-condenses to the cis- and trans-forms of the linear trimers noted above. The formation of the ion proceeds as follows:

EQUATION 5

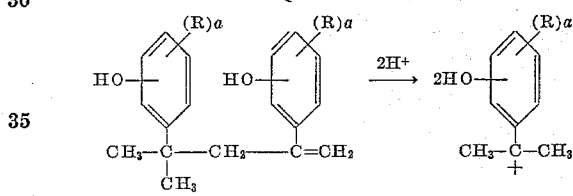

wherein R, $a$ and the position of OH are as previously defined.

Separation of the cis-, trans-isomers is conveniently accomplished by conducting the reaction using an organic diluent in which the starting material and one of the isomers are insoluble and in which the other isomer is soluble. With such an arrangement, one isomer precipitates out of the reaction mixture as a solid and is recovered as a filter cake. The other isomer is recovered from the mother liquor by adding to the mother liquor a liquid in which the trans-isomer is insoluble, such as water, with the result that trans-isomer precipitates out of solution. If desired, the pH of the mother liquor can be adjusted to below 2 prior or after adding the water thereto.

Illustrative of suitable organic diluents and those wherein the trans-form of the isomer is soluble are the following: Alcohols having the formula:

(Formula IV)      $R^2OH$ wherein $R^2$ is alkyl having 1 to 6 carbon atoms inclusive. Among such alcohols can be noted methanol, ethanol, n-propanol and the like; acids having the formula:

(Formula V)      $R^3COOH$ wherein $R^3$ is hydrogen or alkyl having 1 to 3 carbon atoms inclusive. Exemplary of such acids are formic acid, acetic acid and the like.

The linear trimer, either the cis- or trans-forms, can be reacted with a phenol falling within the scope of Formula III, under the same conditions (temperature, pH and the like) as defined for the reaction of an isopropenyl phenol and a phenol of Formula III, to produce a dihydric, polynuclear phenol.

This reaction proceeds as follows:

EQUATION 6

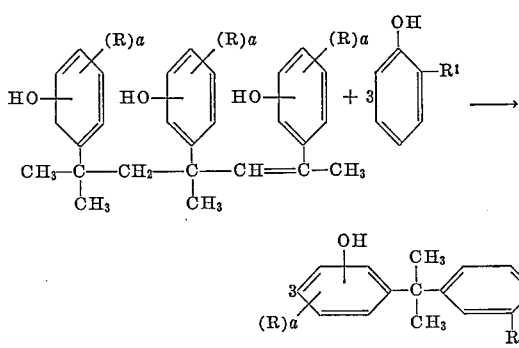

Amounts of reactants used are at least about 3 moles of phenol per mole of trimer, and preferably about 3 moles to about 15 moles of phenol per mole of trimer. More than about 15 moles of phenol per mole of trimer can be used if so desired.

In a manner identical to that described for the reaction of an isopropenyl phenol and a phenol falling within the scope of Formula III (temperature, amount of reactants, pH of reaction mixture, recovery of product and the like), a linear dimer falling within the scope of Formula II can be reacted with a phenol which has the formula:

(Formula VI)

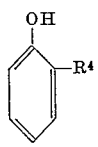

wherein $R^4$ is

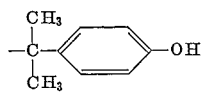

to form a trisphenol having the formula:

Formula VII)

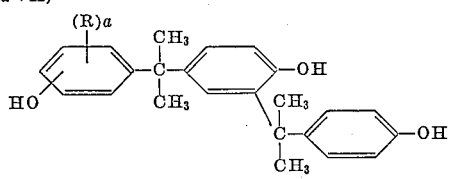

wherein R, $a$ and the position of OH are as previously defined.

The dihydric polynuclear compounds noted in Equation 2 and the linear trimers noted in Equation 4 can be reacted with epichlorohydrin in an alkaline medium to produce polyglycidyl ethers. Polyglycidyl ethers thus produced can be used in molding applications, can be used to form encapsulating compositions, in admixture with the usual curing agents, for electrical components and the like. For a detailed description of suitable procedures to be used in conducting the reaction between polyhydric compounds and epichlorohydrin to form the polyglycidyl ethers, reference is made to U.S. Patent 2,943,045 to A. G. Farnham et al., which is incorporated herein by reference.

The dihydric polynuclear compounds noted in Equation 2 and the linear trimers noted in Equation 4 can be reacted with propylene oxide to form polyols, in a manner well known in the art, these polyols having wide utility in the preparation of polyurethane resins.

The following examples further illustrate the present invention:

*Example 1*

This example illustrates the preparation of a cyclic dimer by the self condensation of p-isopropenyl phenol.

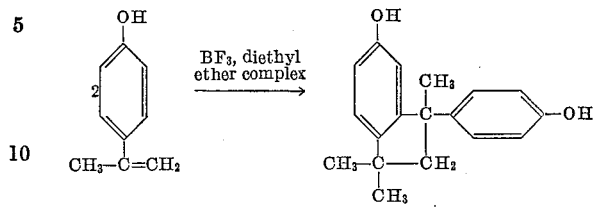

One hundred and twenty-five grams of p-isopropenyl phenol were dissolved in 350 cc. of dry toluene and the mixture heated to 85° C. After the mixture was heated to a temperature of 85° C., 0.4 cc. of a complex of diethyl ether and boron trifluoride was added thereto. The reaction was exothermic for about 5 to about 10 minutes and crystals began to form in the reaction mixture after about 10 minutes. The temperature of the reaction mixture was maintained at 80° C. to 90° C. for 40 minutes after which time, the reaction mixture was cooled to a temperature of 0° C. to 10° C. and 200 ml. of water added thereto. The product which formed was recovered as a filter cake and washed with small portions of toluene and water. The washed product was then recrystallized from a mixture of methanol and water.

The cyclic dimer produced, having the formula indicated above, had a melting point of 194° C. to 195° C.
*Analysis.*—Calculated: C, 80.56; OH, 12.7; H, 7.52. Found: C, 80.07; OH, 12.95; H, 7.29. Molecular weight: Calculated: 268. Found: 264.

*Example 2*

This example illustrates the preparation of 2,2-bis-(p-hydroxyphenyl)propane by the reaction of phenol with the linear dimer of p-isopropenyl phenol.

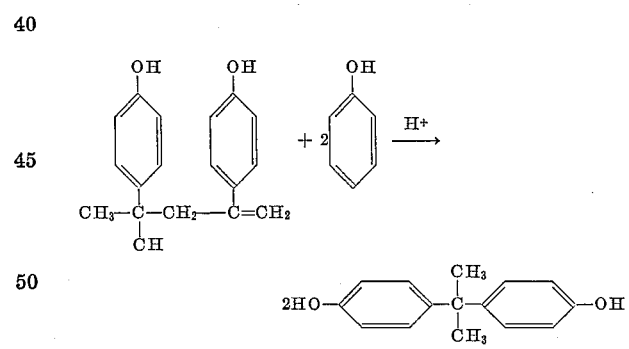

(a) Preparation of the linear dimer of isopropenyl phenol having the formula:

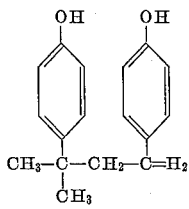

Two hundred and seventy-two grams of p-isopropenyl phenol having a boiling point of 115° C. at a pressure of 8 mm. of Hg were heated under a nitrogen gas atmosphere at a temperature of 125° C. for 1 hour. The yellow liquid which formed was cooled to a temperature of about 115° C.–120° C. whereupon the mass entirely solidified to a white solid tinged with yellow. The solid was melted by heating to a temperature of about 135° C., the melted product dissolved in hot toluene and recrystallized out of solution by cooling the solution to a temperature of 5° C.

The dimer was recovered as a filter cake in the form of white crystals which melted at a temperature of 127° C.–130° C. Two hundred and three grams of dimer were recovered which represented a yield of seventy-five percent by weight.

Infrared analysis of the dimer showed absorption bands at 11.2μ due to the

group, which is about half the absorption that is shown by p-isopropenyl phenol.

(b) Preparation of 2,2-bis-(p-hydroxyphenyl)propane.

A mixture of 5 grams of the linear dimer of (a), 25 grams of phenol and sufficient HCl (37%) to effect a pH of about 1 in the reaction mixture was allowed to stand at a temperature of 25° C. for one hour. After the one hour period, the excess phenol was distilled off under a pressure of 15 mm. of Hg to a pot temperature of 175° C. The product remaining in the reaction vessel was recovered and recrystallized from toluene yielding 7.2 grams of 2,2-bis-(p-hydroxyphenyl)propane.

Melting point=155° C. to 157° C.

A mixture of 2,2-bis-(p-hydroxyphenyl)propane, as produced, with an equal amount of "authentic" 2,2-bis-(p-hydroxyphenyl)propane showed no depression in melting point.

*Example 3*

This example illustrates the preparation of 2,2-(4-hydroxyphenyl-3'-methyl-4'-hydroxyphenyl)propane by the reaction of o-cresol with the linear dimer of p-isopropenyl phenol.

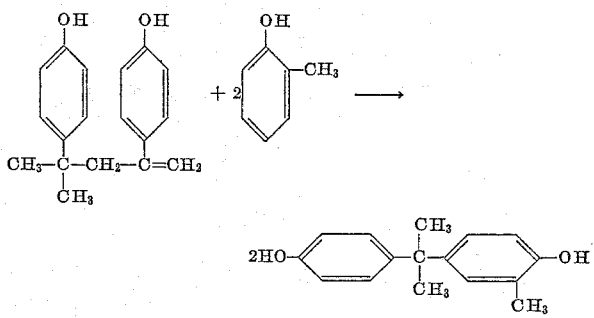

A mixture of 10 grams of the linear dimer of Example 1 (a), 46 grams of o-cresol and sufficient HCl (37%) to effect a pH of about 1 in the reaction mixture, was allowed to stand at a temperature of 25° C. for one hour. After the one hour period, the excess cresol was distilled off under a pressure of 15 mm. of Hg to a pot temperature of 175° C. The product remaining in the reaction vessel was recovered and recrystallized from toluene yielding 14 grams of 2,2-(4-hydroxyphenyl-3'-methyl-4'-hydroxyphenyl)propane.

Melting point=120.5° C. to 121° C.

*Example 4*

Example 2 was repeated using 10 grams of the linear dimer of Example 2 (a) and 40 grams of phenol. The 2,2-bis-(p-hydroxyphenyl)propane produced had a melting point of 155° C. to 157° C.

*Example 5*

This example illustrates the preparation of a trisphenol by the reaction of the linear dimer of p-isopropenyl phenol and a bisphenol.

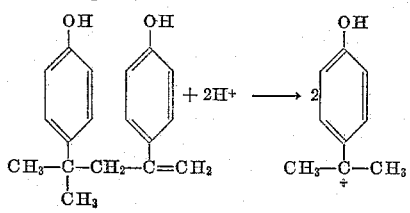

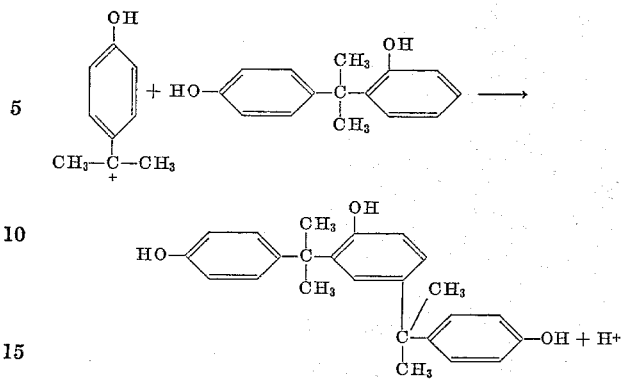

A mixture of 1.14 grams of 2,2-(4-hydroxyphenyl-2'-hydroxyphenyl)propane, 0.68 gram of the linear dimer of p-isopropenylphenol, 2.5 cc. of benzene and enough HCl (37%) to adjust the pH of the mixture to about 1 was warmed at a temperature of 60° C. for ½ hour. The benzene and HCl were removed by heating the reaction mixture under a pressure of 15 mm. of Hg and to a pot temperature of 175° C. The product was recrystallized from benzene to yield 0.3 gram of the trisphenol having a melting point of 189.5° C. to 191.5° C.

*Example 6*

This example illustrates the preparation of linear trimers by the self-condensation of p-isopropenyl phenol.

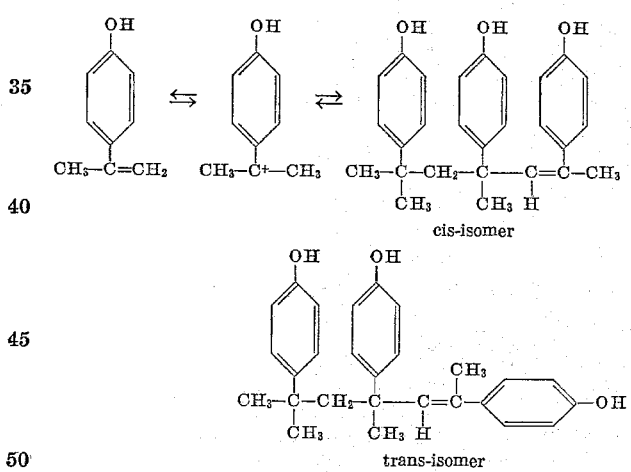

Thirty grams of p-isopropenyl phenol were dissolved in 150 cc. of acetic acid (50%) and to this solution there was then added 0.2 cc. of HCl (37%) thereby adjusting the pH of the solution to about 1. The solution was allowed to stand for 18 hours at a temperature of 25° C. with the result that white crystals precipitated out of solution. The white crystals, the cis-isomer, were recovered by a filtration operation and the mother liquor recovered. The crystals were washed with 20 ml. of acetic acid (50%). The crystals were recrystallized from a mixture of methanol and water.

*Analysis.*—Melting point=229° C. to 230° C. Molecular weight, calculated=402, found=390. Percent OH, calculated=12.7, found=12.7.

The cis-isomer was identified by infrared analysis.

The trans-isomer was recovered by diluting the acetic acid washings and mother liquor, noted above, with 75 ml. of water and adding 2 cc. of HCl thereto. (pH of the mixture after the addition of HCl was about 1.) On standing for 24 hours at a temperature of 25° C., white crystals formed in the reaction mixture. The crystals were recovered by a filtration operation and recrystallized from a mixture of acetic acid and water.

*Analysis.*—Melting point=169° C.–170° C. Molecular weight, calculated=402, found=387. Percent OH, calculated=12.7, found=12.85.

The trans-isomer was identified as such by infrared analysis.

Example 7

Example 6 was repeated using in lieu of p-isopropenyl phenol, the linear dimer of p-isopropenyl phenol. The reaction proceeded as follows:

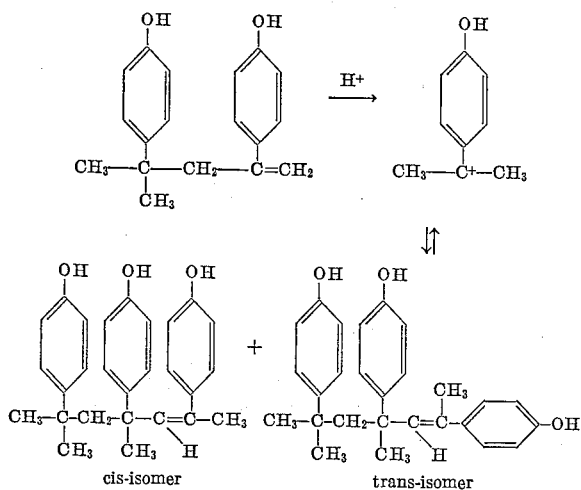

The preparation of the trimers and the separation thereof was effected as described in Example 6.

Example 8

This example illustrates the preparation of a bisphenol by the reaction of phenol and the trimer of Example 6 (cis-form).

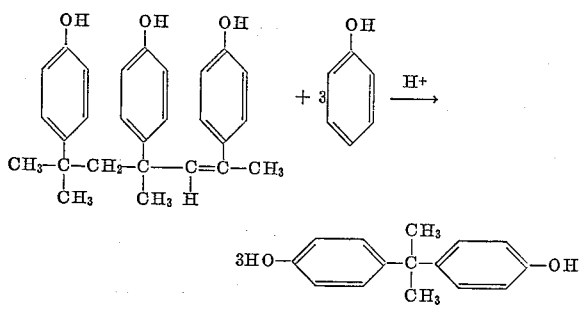

A mixture of 10 grams of the linear trimer of Example 6 (cis-form), 50 grams of phenol and sufficient HCl (37%) to adjust the pH of the mixture to about 1 was allowed to stand at a temperature of 50° to 70° C. for one hour. After the one hour period, the phenol was distilled off under a pressure of 15 mm. of Hg to a pot temperature of 180° C. The product remaining in the reaction vessel was recovered and recrystallized from toluene, yielding 16.2 grams of 2,2-bis-(p-hydroxyphenyl)propane. The 2,2-bis-(p-hydroxyphenyl)propane had a melting point=155° to 157° C.

A mixture of 2,2-bis-(p-hydroxyphenyl)propane, as produced, and an equal amount of "authentic" 2,2-bis-(p-hydroxyphenyl)propane showed no depression in melting point.

2,2-bis-(p-hydroxyphenyl)propane was produced using the trans-isomer in lieu of the cis-isomer of the trimer, in a manner as described above.

Example 9

This example illustrates the reaction of 2,6-dichloro-4-isopropenyl phenol with phenol to produce a bisphenol.

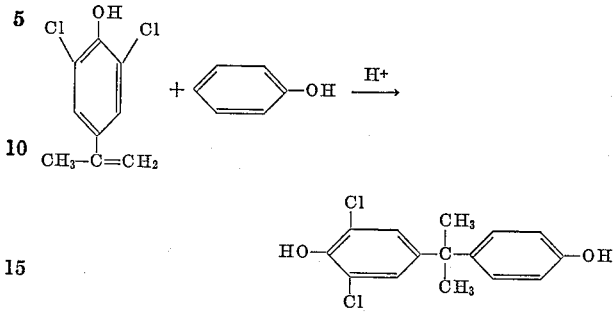

A mixture of 4.05 grams of 2,6-dichloro-4-isopropenyl phenol, 20 grams of phenol and enough HCl (37%) to adjust the pH of the mixture to about 1 was heated for 2 hours at 50° to 60° C. then heated under a pressure of 15 mm. of Hg to a pot temperature of 180° C. The product was removed from the reaction vessel and recrystallized from toluene yielding 4.2 grams of 2,2-(4-hydroxyphenyl-4'-hydroxy-3',5'-dichlorophenyl)propane.

*Analysis.*—Melting point=116° C. to 117° C. Percent OH, calculated=11.44, found=11.04.

What is claimed is:

1. Process for preparing a linear trimer which comprises self-condensing, in a reaction medium having a pH of less than about 2, a compound which is a member of the group consisting of isopropenyl phenols having the formula:

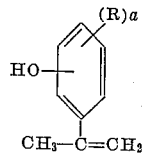

wherein R is a member selected from the group consisting of halogens and alkyls, $a$ has a value of 0 to 4 inclusive and OH is in a position other than meta with respect to the alkenyl group, and a linear dimer having the formula:

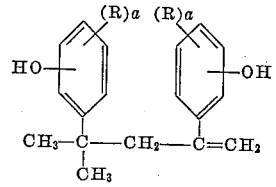

wherein R, $a$ and the position of each OH are as defined. to produce a linear trimer having the formula:

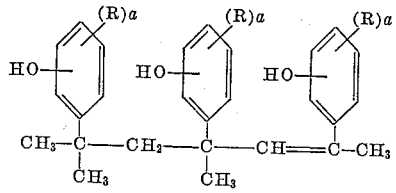

wherein R, $a$ and the position of each OH are as defined.

2. Process as defined in claim 1 wherein the compound which is self-condensed to the corresponding linear trimer has the formula:

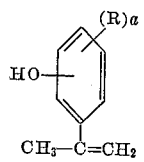

wherein R is a member selected from the group consisting of halogens and alkyls, $a$ has a value of 0 to 4 inclusive and OH is in a position other than meta with respect to the alkenyl group.

3. Process as defined in claim 2 wherein the said isopropenyl phenol is p-isopropenyl phenol.

4. Process as defined in claim 1 wherein the said condensation is conducted at a temperature of about 20° C. to about 40° C.

5. Process as defined in claim 1 wherein the self-condensation is conducted at a temperature of about 25° C. to about 30° C.

6. Process as defined in claim 1 wherein the linear dimer is formed from p-isopropenyl phenol.

7. A linear trimer having the formula:

$$\text{HO-}\underset{(R)_a}{\phantom{X}}\text{-}\underset{CH_3}{\underset{|}{C}}\text{-}CH_2\text{-}\underset{CH_3}{\underset{|}{C}}\text{-}CH=\underset{}{C}\text{-}CH_3 \text{ (with three HO-aryl-(R)}_a \text{ groups)}$$

wherein R is a member selected from the group consisting of halogens and alkyls, $a$ has a value of 0 to 4 inclusive, each OH is in a position other than meta with respect to the group linking the aromatic nuclei.

8. A linear trimer having the formula:

(structure with three OH-phenyl groups linked by $-CH_3\underset{|}{\underset{CH_3}{C}}-CH_2-\underset{|}{\underset{CH_3}{C}}-CH=C-CH_3$)

9. A linear trimer having the formula:

(structure with two OH-phenyl groups and additional $-CH_3-\underset{|}{\underset{CH_3}{C}}-CH_2-\underset{|}{\underset{CH_3}{C}}-\underset{H}{\underset{|}{C}}=C(CH_3)-\text{phenyl-OH}$)

10. Process for the preparation of a dihydric, polynuclear phenol which comprises reacting, in a reaction medium having a pH of less than about 2, a linear trimer as defined in claim 7 with a phenol having the formula:

$$\text{OH-phenyl-R}^1$$

wherein $R^1$ is a member selected from the group consisting of alkyl and hydrogen, to produce a dihydric, polynuclear phenol having the formula:

(trisphenol structure with OH, $(R)_a$, $CH_3$/$CH_3$ quaternary carbon, phenyl-OH, $R^1$)

wherein R and $a$ are as defined and OH is in a position other than meta with respect to the group linking the aromatic nuclei.

11. Process as defined in claim 10 wherein the said phenol is used in amounts of at least about 3 moles per mole of said linear trimer.

12. Process as defined in claim 10 wherein the said phenol is used in amounts of about 3 moles to about 15 moles per mole of said linear trimer.

13. Process as defined in claim 10 wherein said reaction is conducted at a temperature of about 25° C. to about 75° C.

14. Process as defined in claim 10 wherein said reaction is conducted at a temperature of about 40° C. to about 60° C.

15. Process as defined in claim 10 wherein the said linear trimer is as defined in claim 8.

16. Process for preparing a trisphenol which comprises reacting, in a reaction medium having a pH of less than about 2, a linear dimer having the formula:

$$\text{HO-}\underset{(R)_a}{\phantom{X}}\text{-}\underset{CH_3}{\underset{|}{C}}\text{-}CH_2\text{-}\underset{}{C}=CH_2 \text{ ... -OH}$$

wherein R is a member selected from the group consisting of alkyls and halogens, $a$ has a value of 0 to 4 inclusive and OH is in a position other than meta with respect to the group linking the aromatic nuclei, with a phenol having the formula:

$$\text{OH-phenyl-R}^4$$

wherein $R^4$ has the formula:

$$-\underset{CH_3}{\underset{|}{\overset{CH_3}{\overset{|}{C}}}}-\text{phenyl-OH}$$

to form a trisphenol having the formula:

(trisphenol structure)

References Cited by the Examiner

UNITED STATES PATENTS

| | | | |
|---|---|---|---|
| 2,191,831 | 2/1940 | Perkins | 260—619 |
| 2,891,092 | 6/1959 | Hurdis et al. | 260—619 X |
| 2,979,534 | 4/1961 | Petropoulos et al. | 260—619 |

FOREIGN PATENTS

| | | |
|---|---|---|
| 611,184 | 12/1961 | Belgium. |
| 1,280,765 | 11/1961 | France. |
| 1,004,168 | 3/1957 | Germany. |
| 600,985 | 4/1948 | Great Britain. |

OTHER REFERENCES

Corson et al., Jour. Organic Chem., 23:549 (1958), 1 page.

Chem. Abstracts, vol. 57 (1962), 12383–4 (1 page).

LEON ZITVER, Primary Examiner.

LORRAINE A. WEINBERGER, Examiner.

H. G. MOORE, D. M. HELFER, Assistant Examiners.